United States Patent [19]
Prater et al.

[11] Patent Number: 5,991,815
[45] Date of Patent: Nov. 23, 1999

[54] METHOD OF SUPPLYING MULTIPLE LOADS FROM MULTIPLE SOURCES OVER AN INTERCONNECTED NETWORK OF DEFINED PATHS

[75] Inventors: Keith A. Prater, King George; Alan G. Shimp, Colonial Beach, both of Va.

[73] Assignee: The United States of America as represented by the Secretary of the Navy, Washington, D.C.

[21] Appl. No.: 08/876,659

[22] Filed: Jun. 19, 1997

[51] Int. Cl.⁶ .............................. G06F 15/16; H04L 12/00
[52] U.S. Cl. .......................... 709/239; 709/238; 709/242; 709/249; 370/229; 370/351
[58] Field of Search ................................... 709/239, 238, 709/242, 249; 370/229, 351

[56] References Cited

U.S. PATENT DOCUMENTS

| | | | |
|---|---|---|---|
| 4,466,060 | 8/1984 | Riddle ..................................... | 709/242 |
| 4,736,363 | 4/1988 | Aubin et al. ............................. | 370/400 |
| 4,769,814 | 9/1988 | Bederman et al. ...................... | 370/402 |
| 5,056,085 | 10/1991 | Vu ........................................... | 370/400 |
| 5,187,667 | 2/1993 | Short ....................................... | 701/200 |
| 5,486,822 | 1/1996 | Tenmoku et al. ....................... | 340/995 |
| 5,630,184 | 5/1997 | Roper et al. ............................ | 709/221 |
| 5,732,072 | 3/1998 | Thanner et al. ........................ | 370/255 |

Primary Examiner—Krisna Lim

Attorney, Agent, or Firm—James B. Bechtel, Esq.

[57] ABSTRACT

The method defines a distribution solution for supplying product to a plurality of loads from a plurality of sources via a network of substantially linear path segments that are interconnected at nodes. A combination of minimum spanning trees (MST) and a shortest-path tree (SPT) are applied to the network to form a composite path. The resulting composite path defines a plurality of closed-loop paths in the network. Excluded from consideration in the distribution solution are any of the path segments not included in the composite path. All closed-loop paths are then eliminated by excluding from consideration the one or more path segments having a total weight value that is greatest from each of the closed-loop paths. As a result, a composite tree is defined. The composite tree is then redefined by excluding from consideration in the distribution solution any of the path segments of the composite tree that are not part of a path linking one of the sources to one of the loads. Temporary paths are defined outside of the network to connect the sources. Temporary closed-loop paths are thereby defined by a combination of the temporary paths and the composite tree so-redefined. For each temporary closed-loop path, one or more path segments having a total weight value that is greatest are excluded from consideration in the distribution solution. The distribution solution is defined by remaining ones of the path segments that i) have not been so-excluded by any of the previous steps and ii) are part of a path linking one of the sources to one of the loads.

6 Claims, 15 Drawing Sheets

METHOD OF SUPPLYING MULTIPLE LOADS FROM MULTIPLE SOURCES OVER AN INTERCONNECTED NETWORK OF DEFINED PATHS

ORIGIN OF THE INVENTION

The invention described herein was made in the performance of official duties by employees of the Department of the Navy and may be manufactured, used, licensed by or for the Government for any governmental purpose without payment of any royalties thereon.

FIELD OF THE INVENTION

The invention relates to methods of defining a distribution solution that will identify supply routes from multiple sources to multiple loads using an interconnected network of defined paths.

BACKGROUND OF THE INVENTION

There are many distribution or transportation situations in which a network of defined delivery paths are used to transport a commodity or product between a plurality of sources of the product to a plurality of end users or loads. For example, a ship has a network of pipes to transport water from one or more pumps to a plurality of end user loads throughout the ship. Natural gas originating at a plurality of gas wells is transported across the country to a plurality of end users, using a network of gas lines. Ground transportation of products from warehouses to stores is made possible by either a network of roads and/or rail lines. In each situation, every segment of the network of defined delivery paths can be assigned a weight value indicative of the cost associated with using the segment. The weight value might be the distance of the segment, a maximum travel speed along the segment, etc., or be representative of some combination of physical attributes. In each case, the weight values are used to devise an optimal distribution solution using the network of defined delivery paths. Further, the optimal distribution solution is often dynamic as changes in the network (e.g., a broken pipe, a road or rail line out of service, etc.) necessitate a re-calculation of the distribution solution.

Existing methods of devising a solution for such complex distribution problems include those based on sets of linear equations which have to be minimized and solved simultaneously. The number of equations required is determined from the number N of points or nodes interconnecting the segments of the defined delivery paths. To analyze each combination, $2^N$ equations must be solved simultaneously. Accordingly, this method becomes inefficient as the computational complexity increases with the number of interconnecting nodes.

Two other optimization approaches have been developed to solve some distribution situations. One approach is known in the art as the Minimum Spanning Tree (MST) algorithm and the other is known in the art as the Shortest-Path Tree (SPT) algorithm. A detail description of the MST and SPT algorithms can be found in Chapter 9 of "Introductory Management Science, Second Edition", G. D. Eppen et al., Prentice Hall Inc., 1987. Briefly, the MST is an optimization routine that generates a minimum total path for connecting all nodes in a network of defined delivery paths. The SPT finds the minimum paths linking a source of product to all nodes in the network. However, neither the MST or SPT approaches can be used to solve the aforedescribed multiple source to multiple load distribution problem.

SUMMARY OF THE INVENTION

Accordingly, it is an object of the present invention to provide a method of defining supply routes from multiple sources to multiple loads using an interconnected network of defined paths that link the sources to the loads.

Another object of the present invention to provide a method of devising a preferable solution to complex distribution problems in which multiple loads are supplied from multiple sources.

Still another object of the present invention is to provide a multiple sources to multiple loads solution method that is computationally efficient.

Other objects and advantages of the present invention will become more obvious hereinafter in the specification and drawings.

In the present invention, a system having a plurality of sources of product is connected to a plurality of loads via a network of substantially linear path segments that are interconnected at nodes. Each path segment is assigned a weight value. The method described herein defines a distribution solution for supplying the loads with the product using the path segments. A first minimum spanning tree (MST) is formed that links the loads. A shortest-path tree (SPT) is formed that links each source to all of nodes in the network. A second MST is formed that links the sources, wherein a composite path is defined and includes any path segment included in at least one of the first MST, the SPT and the second MST. The resulting composite path defines a plurality of closed-loop paths in the network. For each closed-loop path, one or more path segments arranged substantially colinearly have a total weight value that is greatest. The total weight value is defined as the sum of each weight value associated with the one or more path segments. Next, any of the path segments not included in the composite path are excluded from consideration in the distribution solution. The composite path is continually redefined by excluding from consideration in the distribution solution the one or more path segments having a total weight value that is greatest from each of the closed-loop paths until no closed-loop path exists. As a result, a composite tree is defined by the composite path so-redefined. The composite tree is then redefined by excluding from consideration in the distribution solution any of the path segments of the composite tree that are not part of a path linking one of the sources to one of the loads. Temporary paths are defined outside of the network to connect the sources. Each temporary path is assigned weight value of zero. Temporary closed-loop paths are defined by a combination of the temporary paths and the composite tree so-redefined as described above. For each temporary closed-loop path, one or more path segments are arranged substantially colinearly and have a total weight value that is greatest. Excluded from consideration in the distribution solution are the one or more path segments having a total weight value that is greatest from each temporary closed-loop path. The distribution solution is then defined by remaining ones of the path segments that i) have not been so-excluded by the above described steps and ii) are part of a path linking one of the sources to one of the loads.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

The method of defining a distribution solution in accordance with the present invention is applicable to a variety of applications. In general, each such application has a number of sources that can supply a product to be distributed, a number of destinations or loads to which the product must be delivered, and a network of defined paths that connect the sources to the loads. Examples of such applications include road and railway transportation problems where products must be efficiently delivered from warehouses to numerous points of sale/distribution using defined road or railway systems. Other examples include fluid (i.e., gas or liquid) delivery systems in which numerous sources or reservoirs of the fluid are used to supply numerous end users of the fluid using a network of interconnected conduits. By way of illustration, the method of the present invention will be explained relative to a fluid delivery system that has lost the use of a portion of a path that links one of the sources to one of the loads. Accordingly, a new distribution solution must be devised that accounts for this loss.

Figure 1:
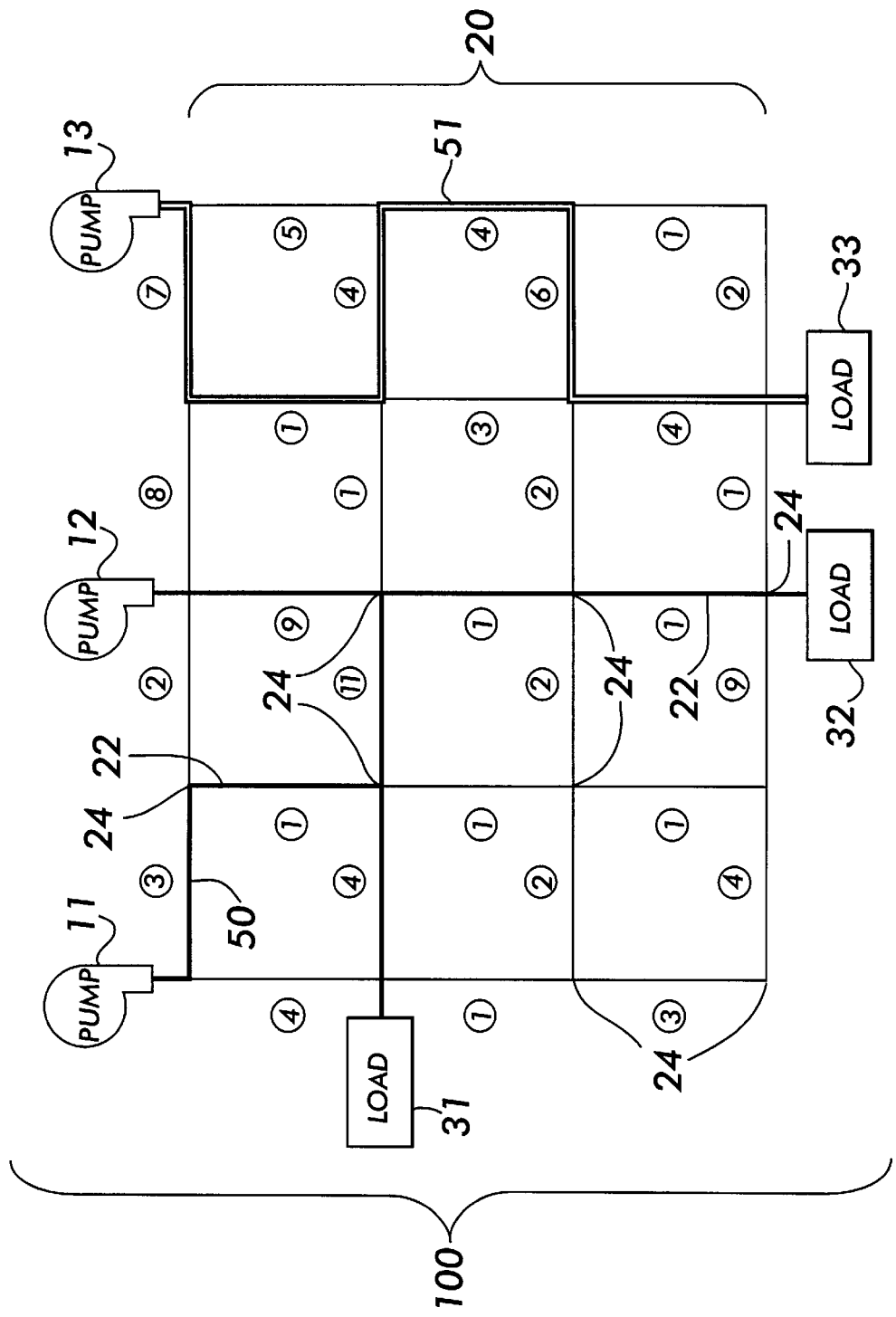
FIG. 1 is a schematic of a fluid delivery system having a plurality of pumps connected to a plurality of loads using defined paths of a network of interconnected path segments.

In FIG. 1, a fluid delivery system is shown and is designated generally by numeral 100. System 100 has fluid pumps 11, 12 and 13 for pumping a fluid product (e.g, water, gas, a slurry, etc.) over a network 20 of path segments 22 to three destinations or loads 31, 32 and 33. However, it is to be understood that the number of pumps, number of loads and size of the network of path segments is not a limitation of the present invention. For purpose of the present invention, once any of pumps 11, 12 and 13 is deemed available for use in the distribution solution, it is considered to be unlimited source of the fluid to be delivered.

In terms of fluid delivery system 100, path segments 22 are conduits that transition to other conduits at points or nodes 24 throughout network 20. In general, nodes 24 define points at which fluid movement may undergo a change. For example, nodes 24 may be realized by a valve, a change in conduit flow area, an elbow, etc. Each path segment 22 has a weight value assigned thereto indicative of the "cost" of using that segment in a defined (flow) path between a source and load. As is known in the art, the assigned weight value can be based upon a number of factors such as length of the segment, flow area, age of the segment, etc. In FIG. 1 and throughout the remainder of the figures, the assigned weight value for each segment 22 is contained within a circle adjacent to each segment. It is assumed at the outset that a defined path exists as indicated by bold line 50 to link pumps 11 and 12 to loads 31 and 32 while a defined path indicated by double-line 51 links pump 13 to load 33. Distribution solution 50 and 51 may have been arrived at by use of the present invention.

Figure 2:
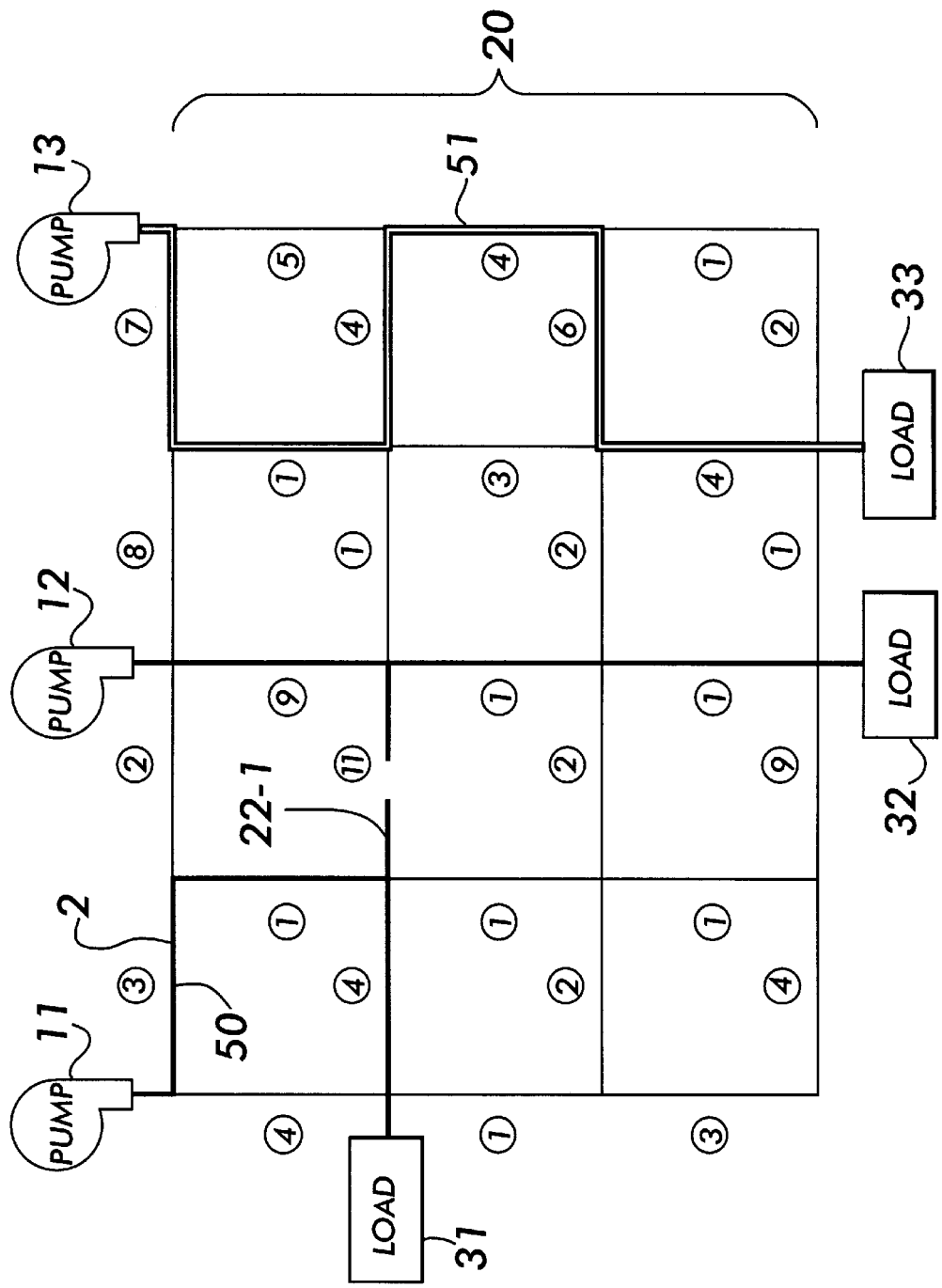
FIG. 2 is a schematic of the fluid delivery system after a break occurs in one of the defined paths.

In FIG. 2, the loss of use of path segment 22-1 is indicated by a break in bold line 50. The loss of use could result from a break in the conduit, routine service on the conduit, etc. Accordingly, any new distribution solution must therefore exclude segment 22-1 from consideration. This will be represented in the remainder of the figures by depicting segment 22-1 as a dashed line with an extremely high weight value, e.g., 9999.

Figure 3:
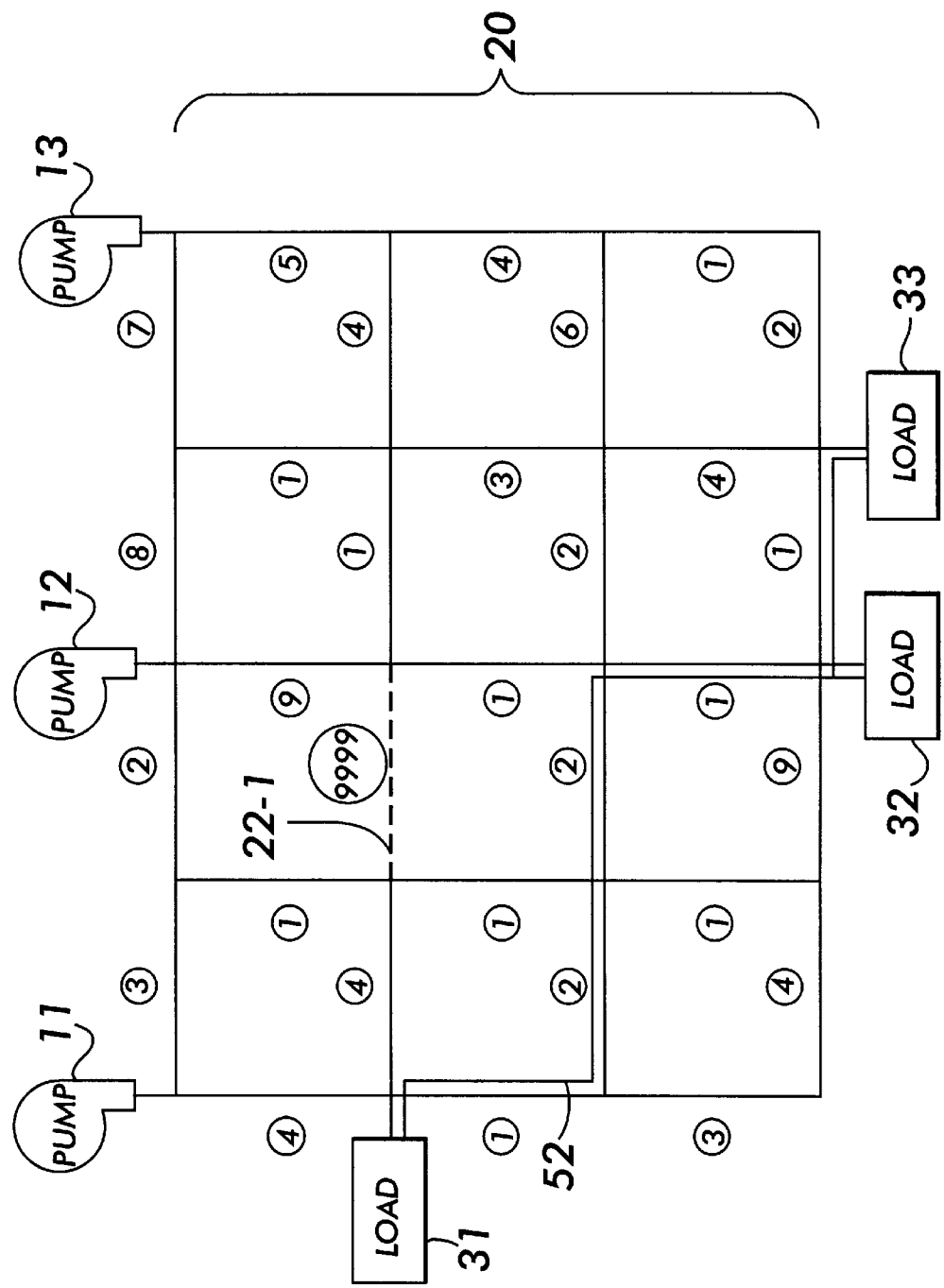
FIG. 3 is a schematic of the fluid delivery system after the break of a path segment shown in FIG. 2 further depicting a minimum spanning tree (MST) to link all loads of the system.
Figure 4:
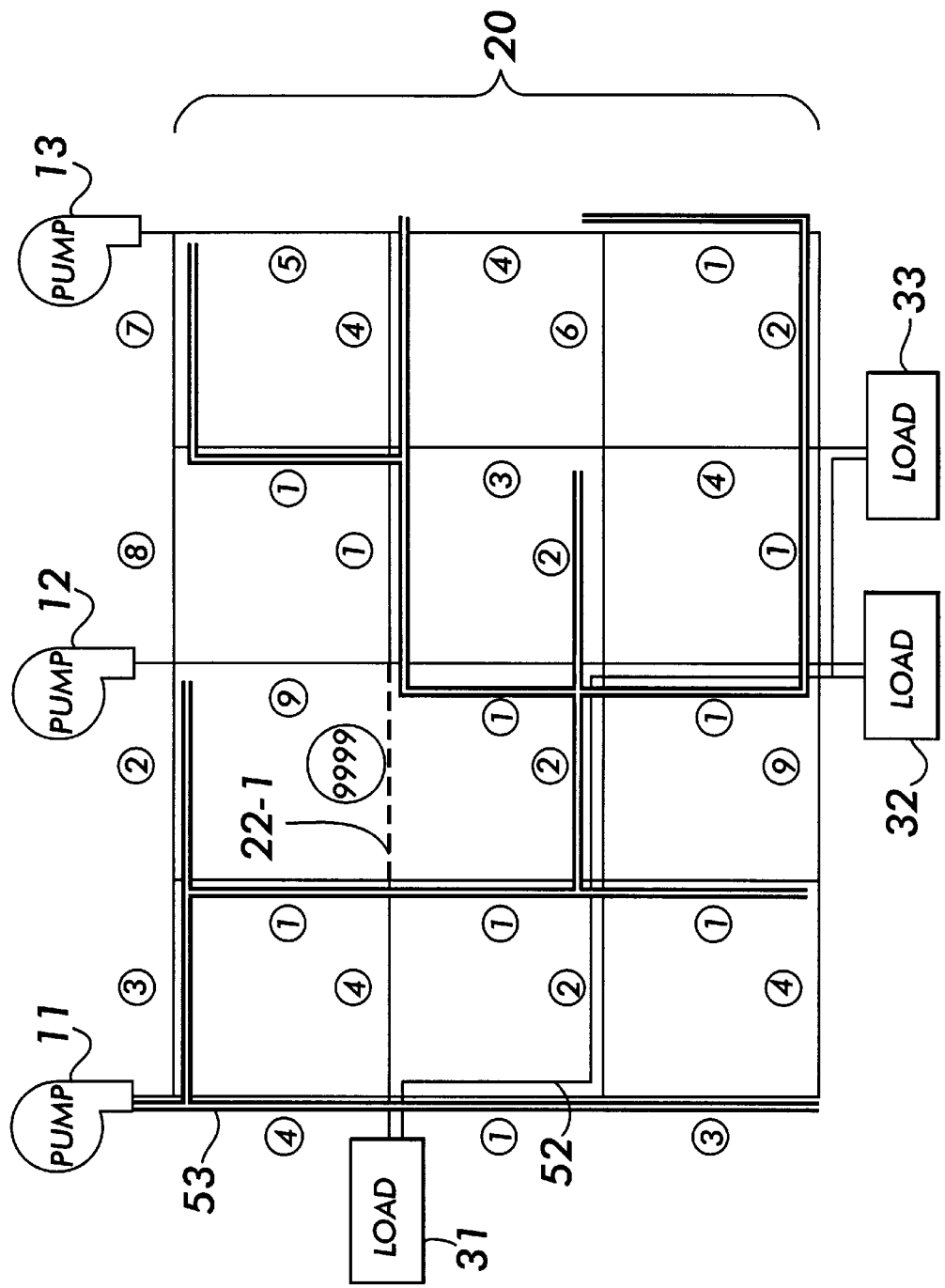
FIG. 4 is a schematic of the fluid delivery system depicting the MST shown in FIG. 3 in combination with a shortest-path tree (SPT) formed from the first pump to all nodes in the network.
Figure 5:
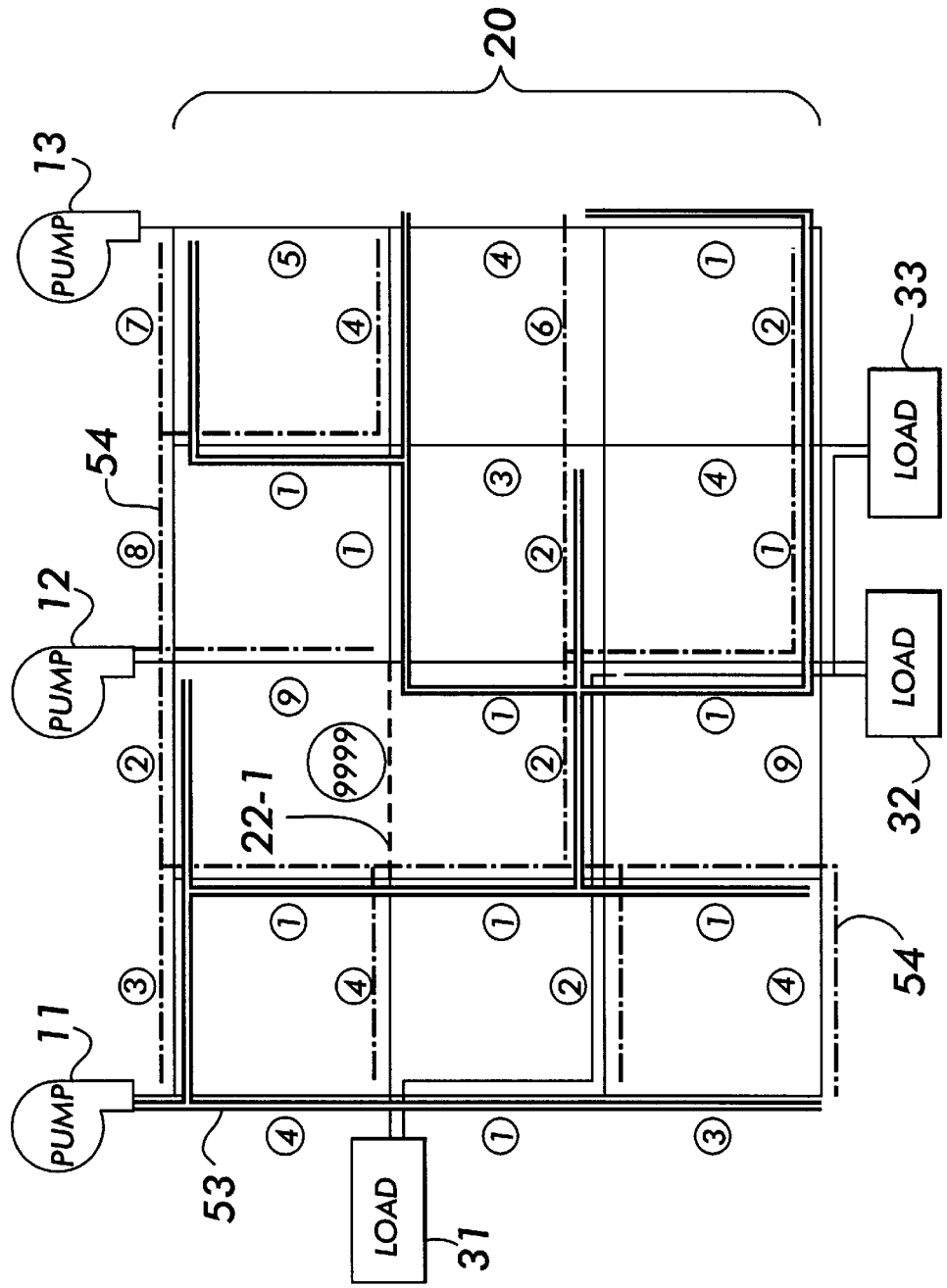
FIG. 5 is a schematic of the fluid delivery system depicting the MST shown in FIG. 3 and the SPT shown in FIG. 4 in combination with an SPT formed from the second pump to all nodes in the network.
Figure 6:
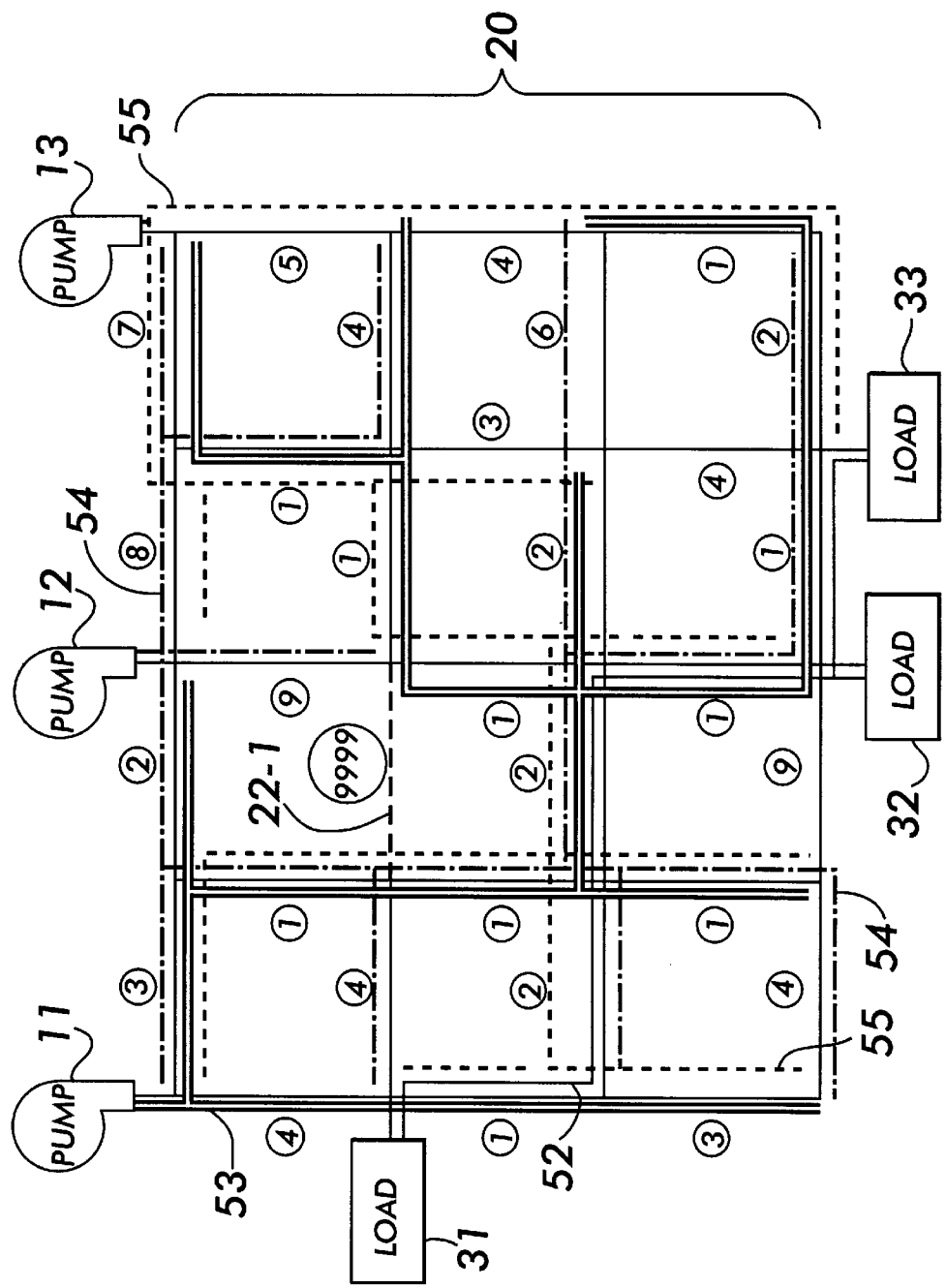
FIG. 6 is a schematic of the fluid delivery system depicting the MST shown in FIG. 3 and the SPT's shown in FIGS. 4 and 5 in combination with an SPT formed from the third pump to all nodes in the network.
Figure 7:
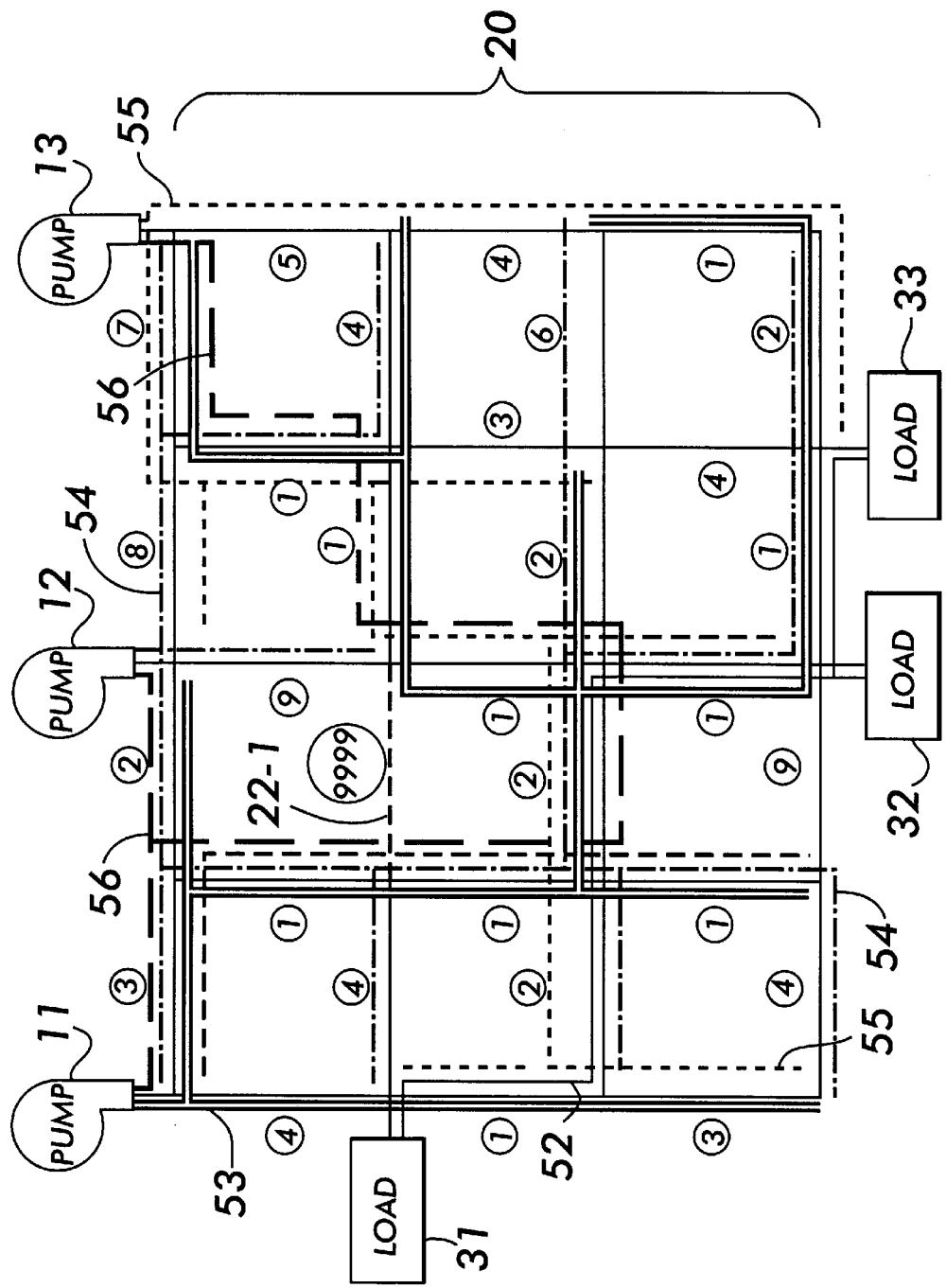
FIG. 7 is a schematic of the fluid delivery system depicting the MST shown in FIG. 3 and the SPT's shown in FIGS. 4, 5 and 6 in combination with an MST to link all three pumps of the system.
Figure 8:
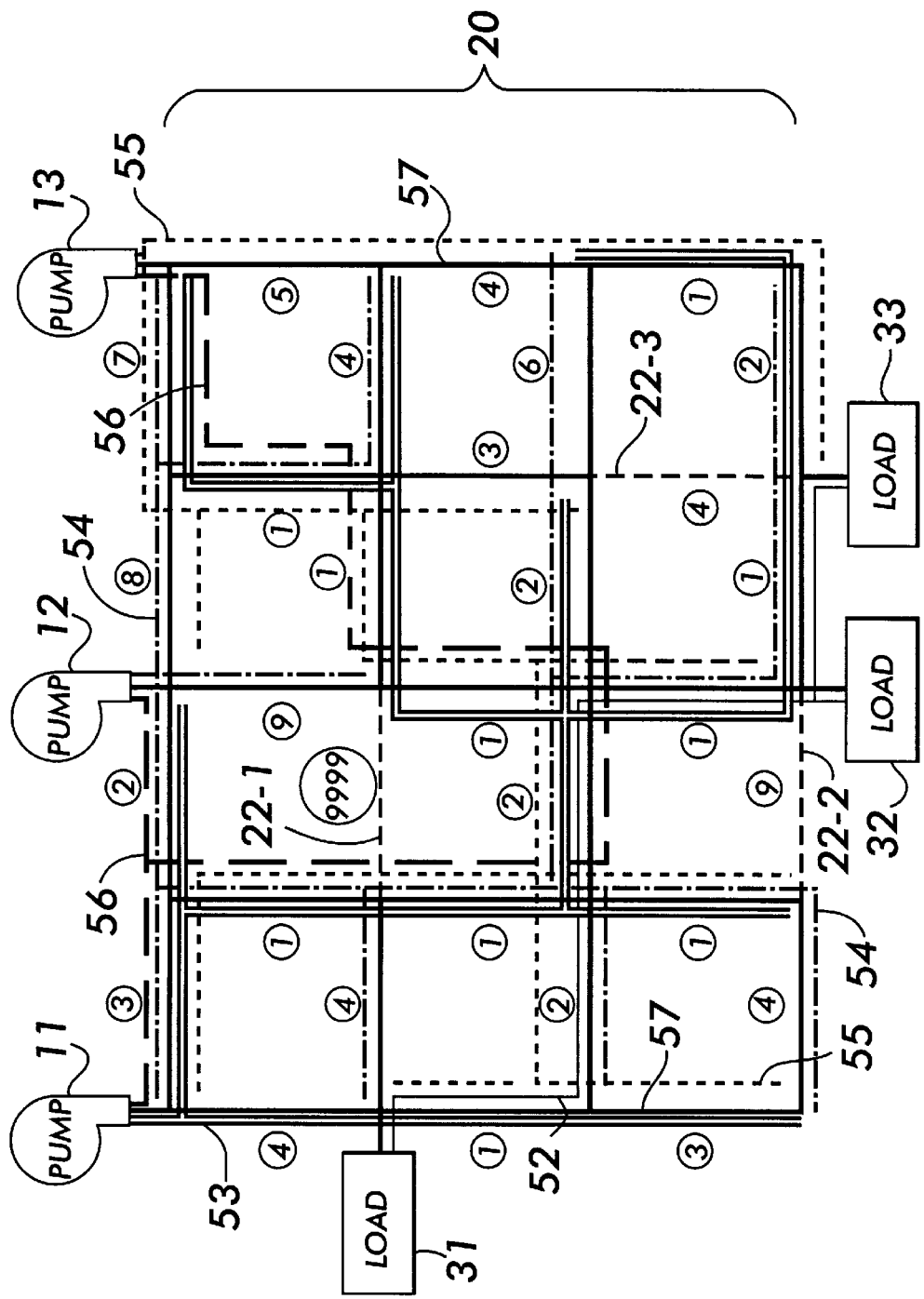
FIG. 8 is a schematic of the fluid delivery system depicting the composite path formed by the combination of paths depicted in FIGS. 3–7.

In the next step of the method depicted in FIG. 3, the process of defining a new distribution solution begins. A minimum spanning tree (MST) (referenced by dotted line 52) is first formed to link all loads 31, 32 and 33 of system 100. The next step involves forming a shortest-path tree (SPT) over network 20 to link each of pumps 11, 12 and 13 to all nodes 24 in network 20. For clarity of illustration, this will be shown progressively where in FIG. 4, the SPT formed from pump 11 to all nodes 24 is depicted by double line 53. The SPT formed from pump 12 to all nodes 24 is depicted in FIG. 5 by dot-dash line 54. The SPT formed from pump 13 to all nodes 24 is depicted in FIG. 6 by dashed line 55. In FIG. 7, an MST referenced by long dashed line 56 is formed to link all pumps 11, 12 and 13 of system 100. The union or combination of the paths depicted in FIGS. 3–7 is a composite path that is depicted in FIG. 8 as a bold line trace 57 of all path segments 22 formed by such combination. Any path segment not included in composite path 57 is automatically excluded from consideration in the distribution solution. Therefore, in the illustrated example, path segments 22-2 and 22-3 are now designated as dashed lines in FIG. 8.

Figure 9:
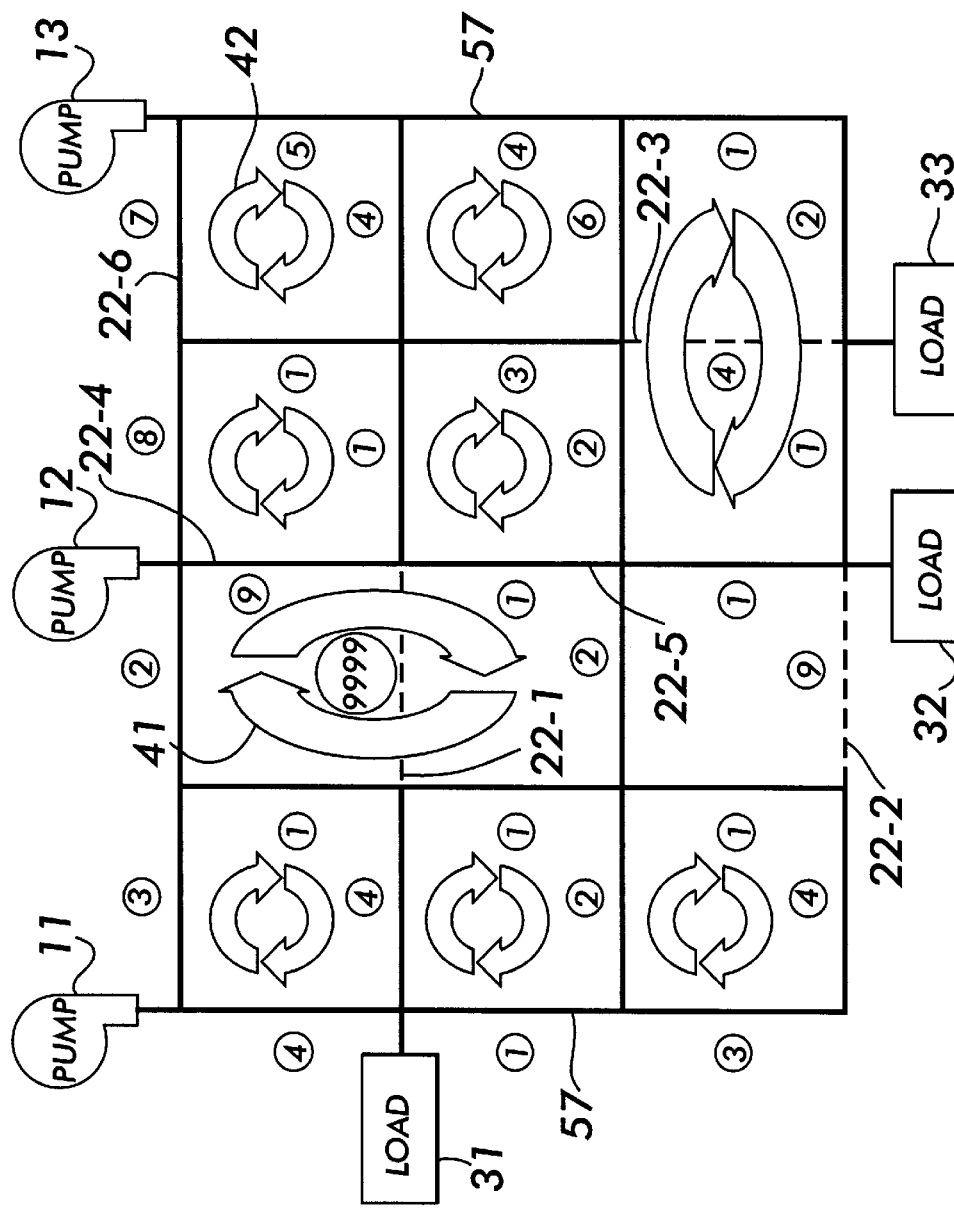
FIG. 9 is a schematic of the fluid delivery system depicting the closed-loop paths formed by the composite path.
Figure 10:
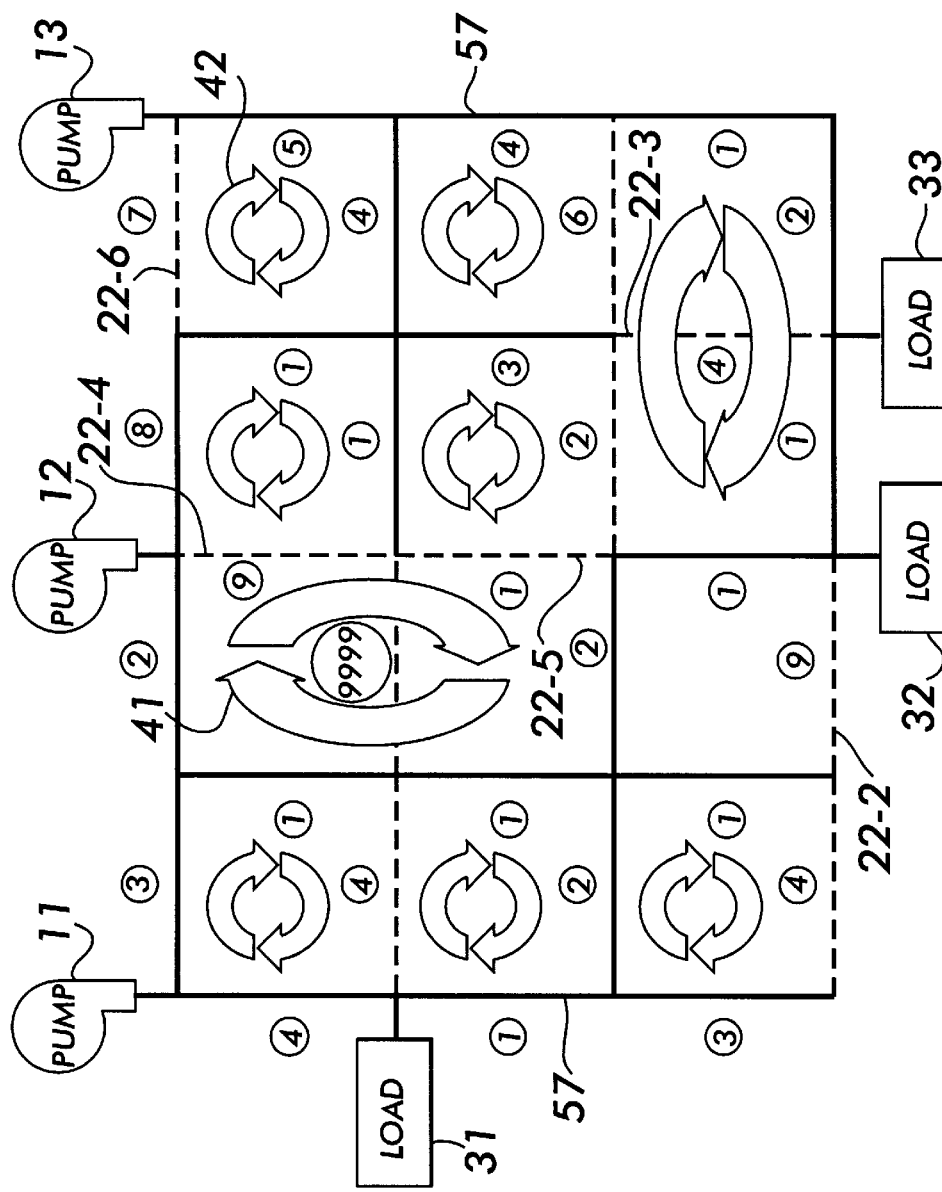
FIG. 10 is a schematic of the fluid delivery system depicting the exclusion of selected path segments from the closed-loop paths depicted in FIG. 9.

Composite path 57 defines a number of closed-loop paths of path segments 22 as shown schematically in FIG. 9. Each closed-loop path is depicted by the use of curved, open-block arrows arranged in a head-to-tail fashion. Nine such closed-loop paths are depicted in FIG. 9. The next step in the present method involves redefining composite path 57 through the elimination of each closed-loop path by selectively excluding from consideration certain ones of path segments 22. This is accomplished by excluding from consideration the leg with the greatest total weight value in each closed-loop path where the term "leg" is defined as any one or more of path segments 22 colinearly or substantially colinearly arranged. For example, the leg with greatest weight value in the closed-loop path indicated by arrows 41 is defined by path segments 22-4 (weight value of 9) and 22-5 (weight value of 1). The leg with the greatest weight value in the closed-loop path indicated arrows 42 in the single path segment 22-6 (weight value of 7). The exclusion of each such leg from each such closed-loop path depicted in FIG. 9 is depicted in FIG. 10 by making such legs appear as dashed lines.

Figure 11:
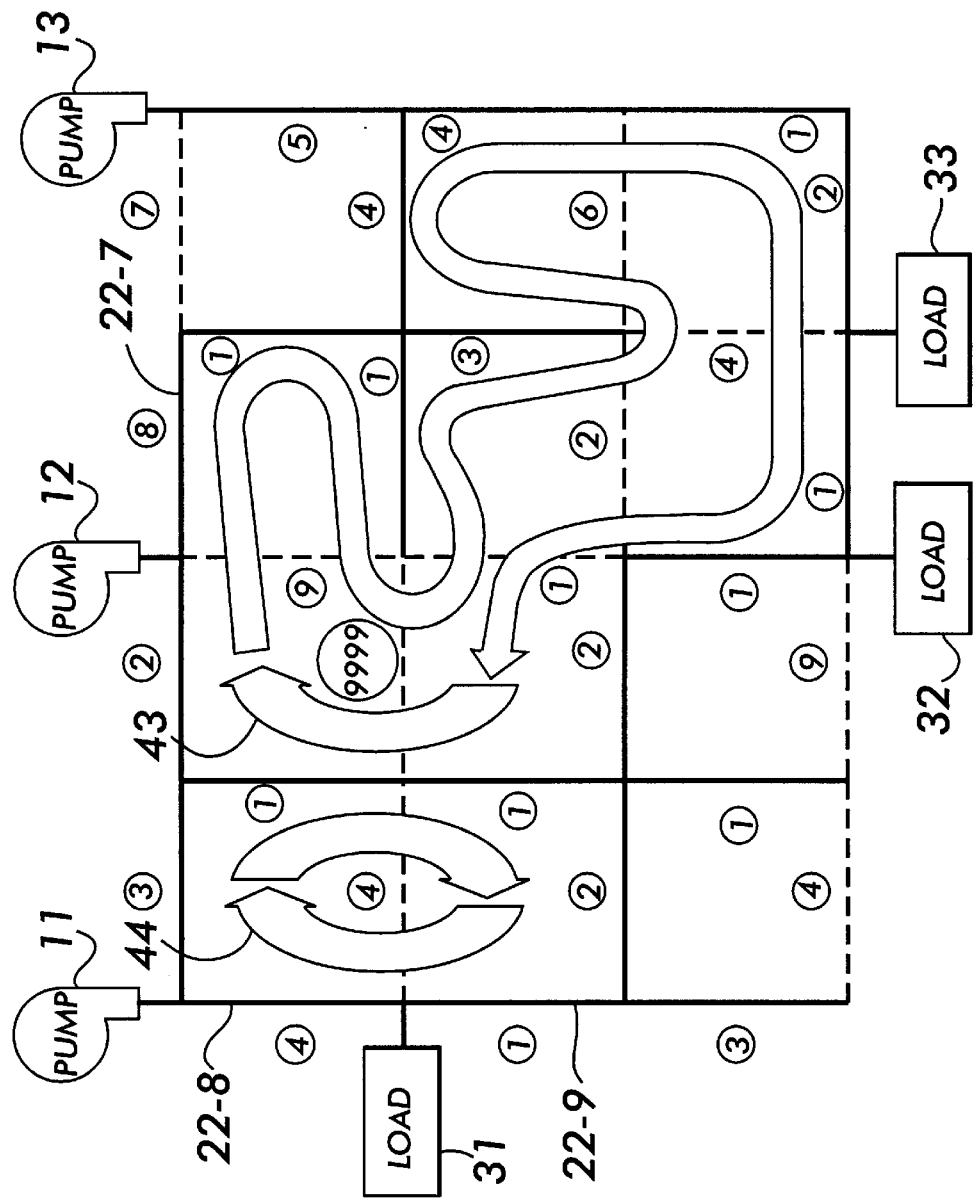
FIG. 11 is a schematic of the fluid delivery system depicting the newly-formed closed-loop paths formed after the exclusion step depicted in FIG. 10.
Figure 12:
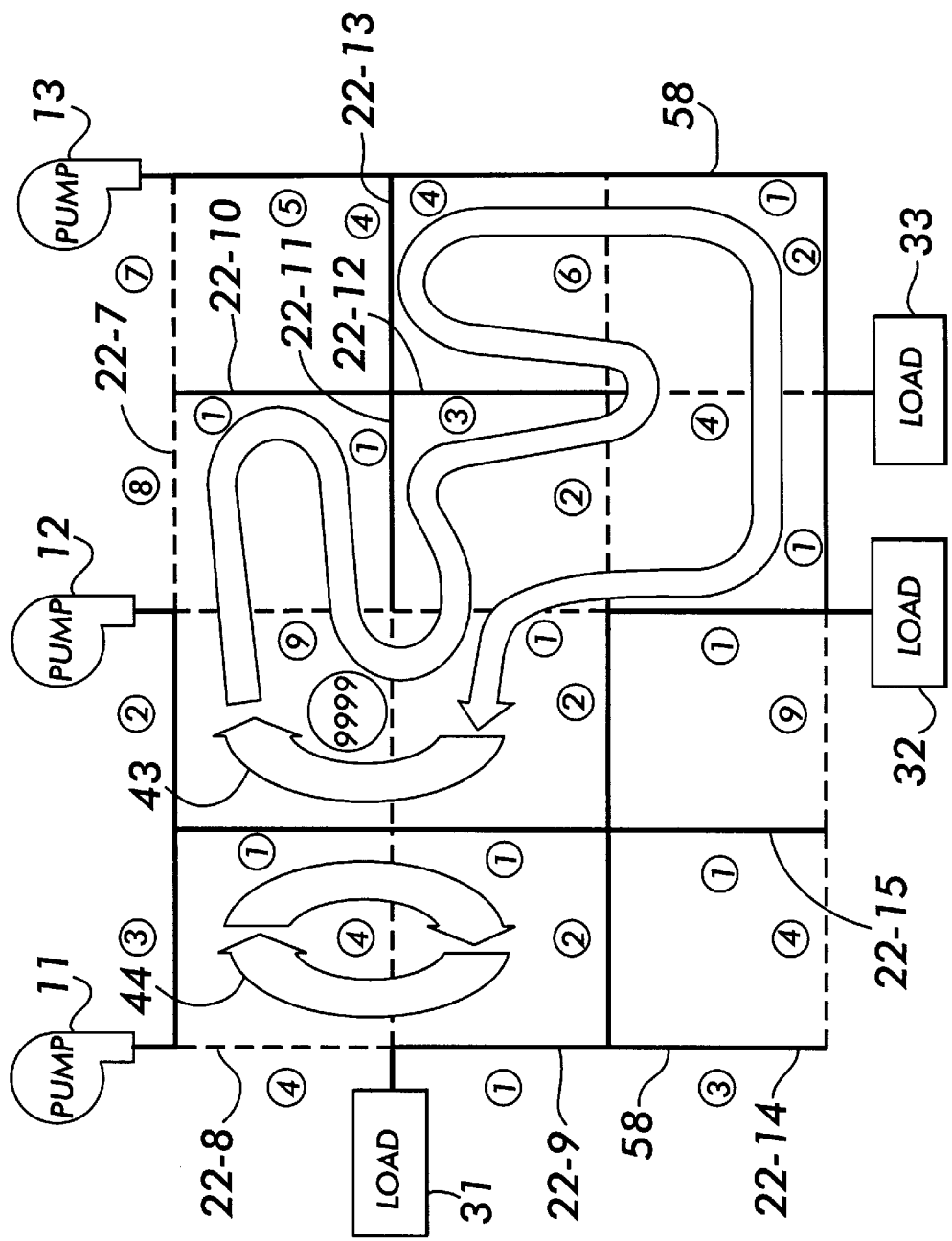
FIG. 12 is a schematic of the fluid delivery system depicting the exclusion of two path segments from the closed-loop paths depicted in FIG. 11 to form a composite tree.

As a result of such exclusion, some new closed-loop paths may be formed as is the case in the illustrated example. This is shown schematically in FIG. 11 where the nine-closed loop paths depicted in FIG. 9 are reduced to two closed-loop paths as indicated by the shaped, open-block arrows arranged in a head-to-tail fashion. Once again, the longest leg in each closed-loop path is excluded from consideration in the distribution solution. For example, the leg with the greatest weight value for the closed-loop path indicated by arrows 43 is path segment 22-7. The leg with the greatest weight value for the closed-loop path indicated by arrows 44 is path segment 22-8. Note that a leg having a greater weight value is formed by the collinear arrangement of path segments 22-9. However, excluding both path segments would essentially isolate load 31 from the distribution solution. Thus, it is important to keep load 31 linked to at least one path segment during the elimination of the closed-loop paths. Accordingly, since path segment 22-8 has a lower weight value, only path segment 22-7 is excluded from consideration. The exclusion of path segments 22-7 and 22-8 is depicted by their dashed-line representation in FIG. 12. The remaining path segments indicated by bold lines 58 are defined herein as a composite tree.

Figure 13:
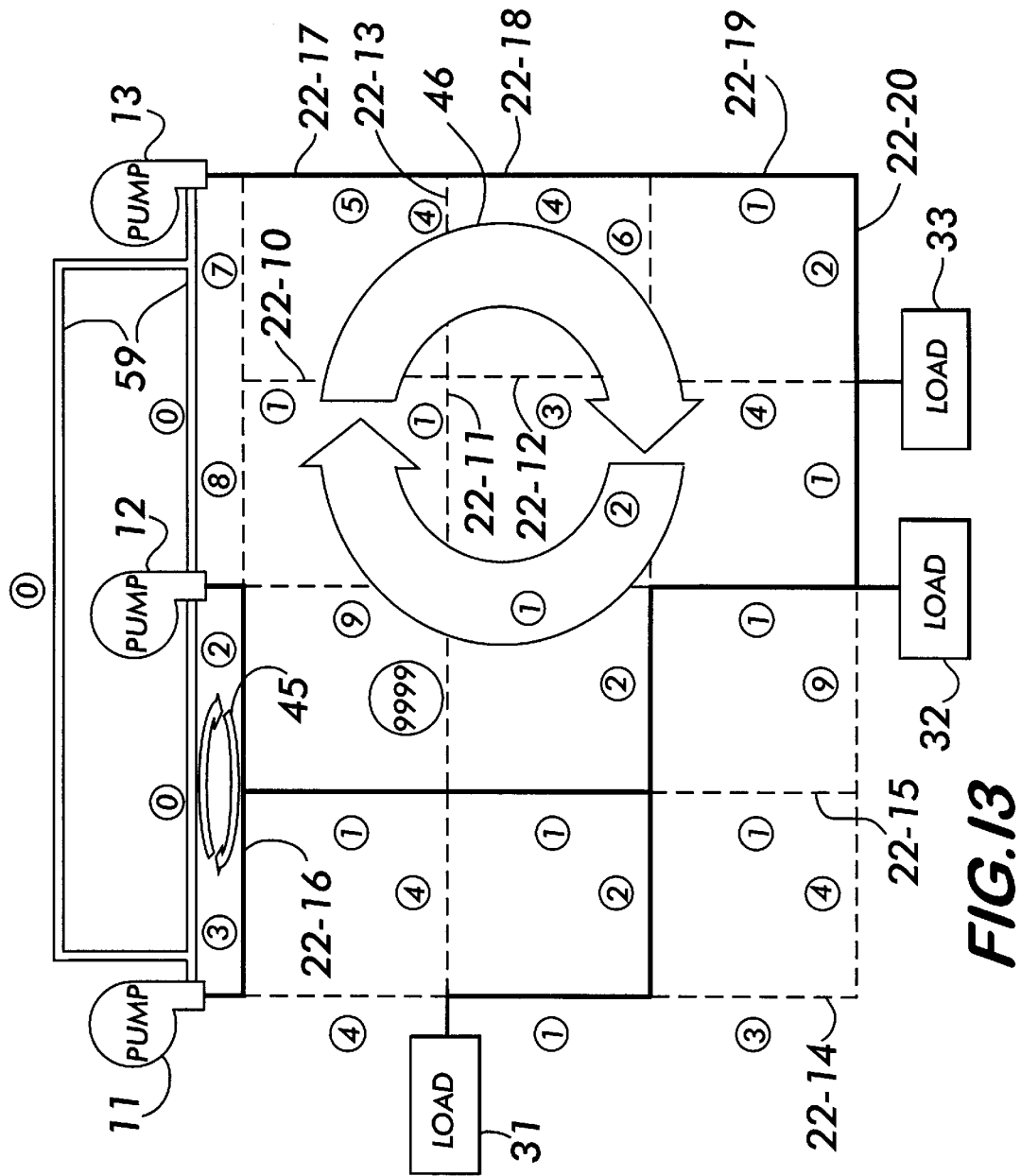
FIG. 13 is a schematic of the fluid delivery system depicting the further exclusion of path segments from the composite tree that do not link a pump to a load, and further illustrates the establishment of temporary paths outside of the network to connect the pumps.

The next couple of steps in the present process are illustrated in FIG. 13. First, FIG. 13 illustrates that any path segment that is part of composite tree 58, but does not form part of a link between a pump and load, is excluded. For the illustrated example, path segments 22-10 through 22-15 fit this definition and are therefore excluded. As before, exclusion is indicated by path segments 22-10 through 22-15 being depicted as dashed lines. FIG. 13 also illustrates the establishment of temporary paths outside of network 20 for connecting all sources or pumps 11, 12 and 13. The temporary paths are illustrated by triple lines 58. Each temporary path 59 is assigned a weight value of zero as illustrated. Resulting closed-loop paths formed by a combination of composite tree 58 and temporary paths 59 must now be eliminated. The two closed-loop paths so formed are illustrated in FIG. 13 by arrows 45 and 46, respectively.

Figure 14:
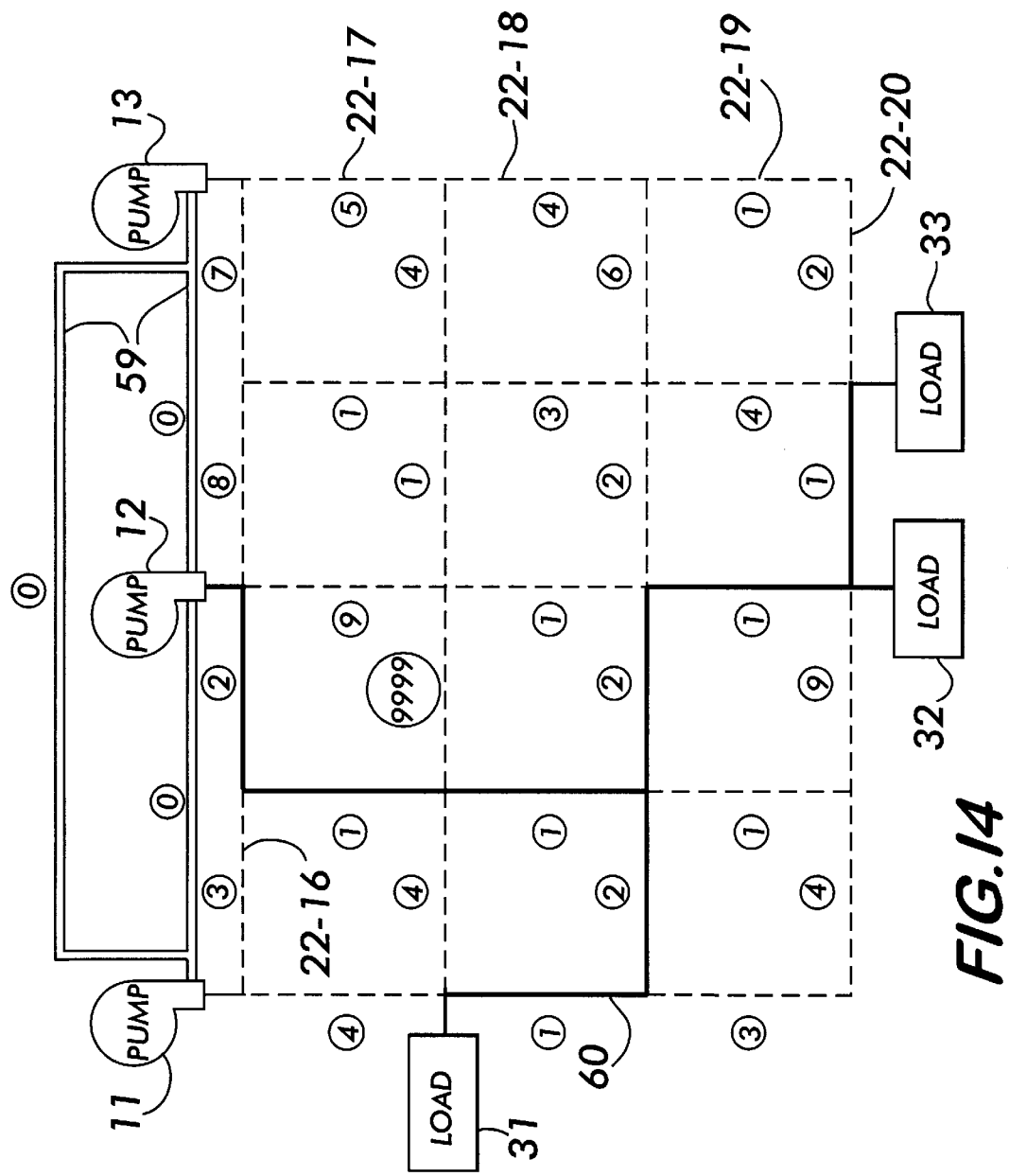
FIG. 14 is a schematic of the fluid delivery system depicting the exclusion of path segments from the closed-loop paths formed in FIG. 13.

As before, the leg in each closed-loop path having the greatest weight value is excluded from consideration in the distribution solution. Such exclusion is realized in the change between FIG. 13 and FIG. 14 where path segment 22-16 is the leg with the greatest weight value for closed-loop path 45. Accordingly, path segment 22-16 is excluded from consideration and is depicted by a dashed-line representation in FIG. 14. For closed-loop path 46, path segments 22-17, 22-18 and 22-19 comprise the leg with the greatest weight value and are therefore excluded from further consideration. Note the FIG. 14 illustration also excludes path segment 22-20 from consideration. This is because path segment 22-20 no longer forms a link between a pump and a load. The remaining portion of composite tree 58 after the process steps illustrated by FIGS. 13 and 14 defines the new distribution solution.

Figure 15:
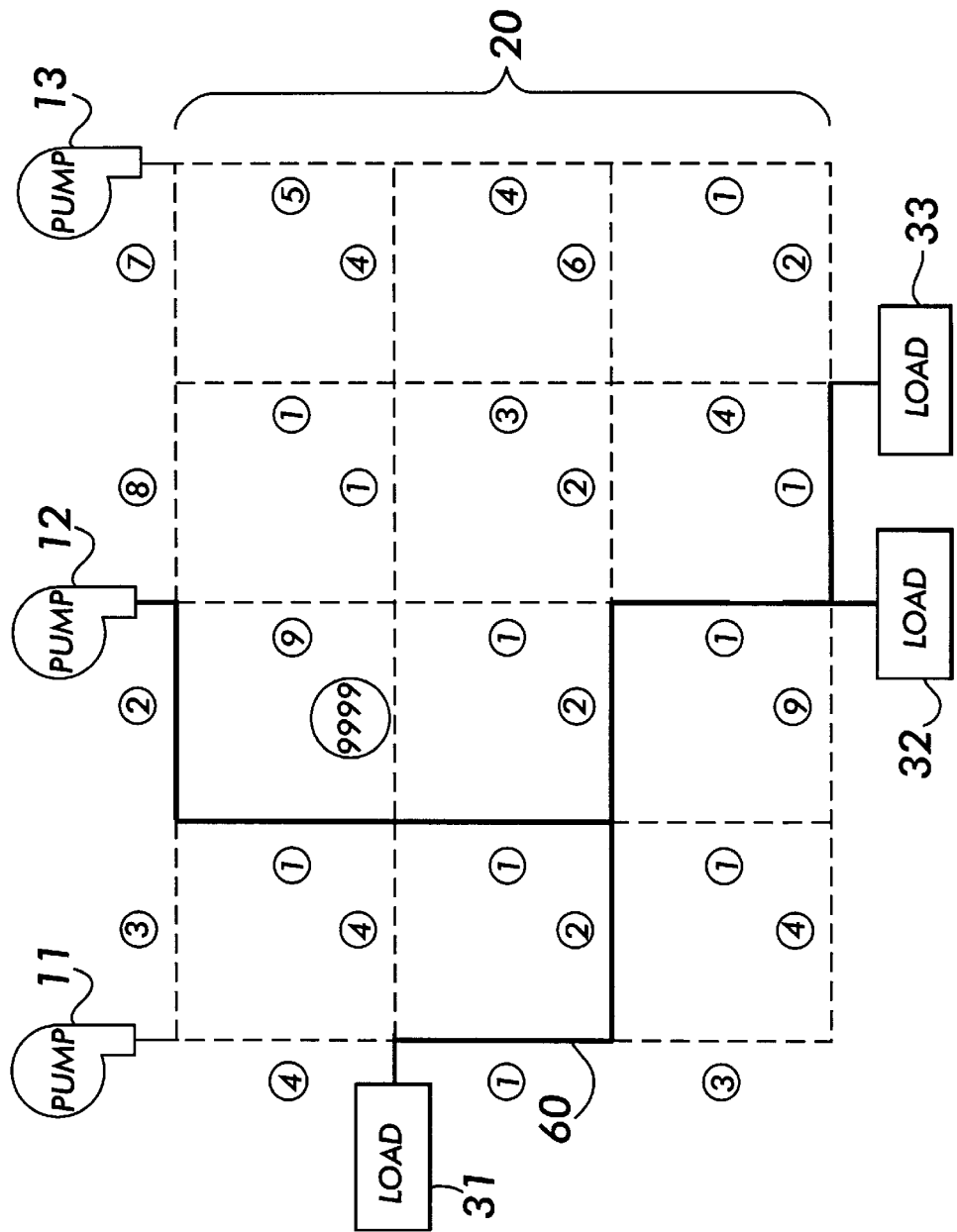
FIG. 15 is a schematic of the fluid delivery system depicting the new distribution solution arrived at by application of the present invention to account for the loss of the path segment shown in FIG. 2.

For clarity of illustration, the new distribution solution is depicted in FIG. 15 by bold lines 60. The temporary paths between pumps 11, 12 and 31 (i.e., temporary paths 59 in FIG. 14) are also eliminated from the illustration. All unused path segments in network 20 that are not a part of distribution solution 60 are illustrated as thin lines.

As noted above, distribution solution 60 is based on the assumption that each of pumps 11, 12 and 13 serves as an infinite source of the fluid to be supplied. This provides the basis for developing an initial solution which can then be used in loading analysis to develop an actual solution. Loading analysis may suggest several possible actions such as breaking connections to segregated loads, re-weighting segments and/or recalculating the algorithm.

The advantages of the present invention are numerous. The problem of defining a distribution solution between multiple sources and multiple loads is achieved without having to solve numerous linear equations. The computational simplicity of the method will have great utility when distribution solutions must dynamically accommodate losses of path segments from a network that must be used to couple the sources to the loads.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. In a system having a plurality of sources of product that must be delivered to a plurality of loads via a network of substantially linear path segments that are interconnected at nodes wherein each of said path segments is assigned a weight value, a method of defining a distribution solution for supplying said plurality of loads with said product using said path segments, said method comprising the steps of:

a) forming a first minimum spanning tree (MST) using said network that links said plurality of loads;

b) forming a shortest-path tree (SPT) using said network that links each of said plurality of sources to all of said nodes in said network;

c) forming a second MST using said network that links said plurality of sources, wherein a composite path is defined and includes any of said path segments included in at least one of said first MST, said SPT and said second MST, said composite path defining a plurality of closed-loop paths in said network wherein, for each of said plurality of closed-loop paths, at least one of said path segments arranged substantially colinearly have a total weight value that is greatest, wherein said total weight value is the sum of each said weight value associated with said at least one of said path segments;

d) excluding from consideration in said distribution solution any of said path segments not included in said composite path;

e) continually redefining said composite path by excluding from consideration in said distribution solution said at least one of said path segments having a total weight value that is greatest from each of said plurality of closed-loop paths until no closed-loop path exists, wherein a composite tree is defined by said composite path so-redefined;

f) redefining said composite tree by excluding from consideration in said distribution solution any of said path segments of said composite tree that are not part of a path linking one of said plurality of sources to one of said plurality of loads;

g) defining temporary paths outside of said network for connecting said plurality of sources, each of said temporary paths being assigned weight value of zero, wherein at least one temporary closed-loop path is defined by a combination of said temporary paths and said composite tree so-redefined in said step f) wherein, for each of said at least one temporary closed-loop path, at least one of said path segments arranged substantially colinearly have a total weight value that is greatest; and h) excluding from consideration in said distribution solution said at least one of said path segments having a total weight value that is greatest from each of said at least one temporary closed-loop path wherein said distribution solution is defined by remaining ones of said path segments not so-excluded by said steps d), e), f) and h) that are part of a path linking one of said plurality of sources to one of said plurality of loads.

2. A method according to claim 1 wherein a condition exists that renders at least one of said path segments unusable, said method further comprising the step of eliminating from consideration in said distribution solution each of said at least one of said path segments rendered unusable prior to performing said step a).

3. A method according to claim 1 wherein said step e) of continually redefining includes the step of maintaining for consideration in said distribution solution at least one of said path segments in said composite tree as a link to each of said plurality of loads.

4. In a fluid delivery system having a plurality of sources of unlimited amounts of fluid that must be delivered to a plurality of loads via a network of substantially linear conduit segments that are interconnected at nodes wherein each of said conduit segments is assigned a weight value, a method of defining a distribution solution for supplying said plurality of loads with said fluid using said conduit segments, said method comprising the steps of:

a) evaluating availability of each of said plurality of sources wherein ones of said plurality of sources deemed available are include in said distribution solution;

b) forming a first minimum spanning tree (MST) using said network that links said plurality of loads;

c) forming a shortest-path tree (SPT) using said network that links each of said ones of said plurality of sources deemed available to all of said nodes in said network;

d) forming a second MST using said network that links said ones of said plurality of sources deemed available, wherein a composite path is defined and includes any of said conduit segments included in at least one of said first MST, said SPT and said second MST, said composite path defining a plurality of closed-loop paths in said network wherein, for each of said plurality of closed-loop paths, at least one of said conduit segments arranged substantially colinearly have a total weight value that is greatest, wherein said total weight value is the sum of each said weight value associated with said at least one of said conduit segments;

e) excluding from consideration in said distribution solution any of said conduit segments not included in said composite path;

f) continually redefining said composite path by excluding from consideration in said distribution solution said at least one of said conduit segments having a total weight value that is greatest from each of said plurality of closed-loop paths until no closed-loop path exists, wherein a composite tree is defined by said composite path so-redefined;

g) redefining said composite tree by excluding from consideration in said distribution solution any of said conduit segments of said composite tree that are not part of a path linking any of said ones of said plurality of sources deemed available to one of said plurality of loads;

h) defining temporary paths outside of said network for connecting said ones of said plurality of sources deemed available, each of said temporary paths being assigned weight value of zero, wherein at least one temporary closed-loop path is defined by a combination of said temporary paths and said composite tree so-redefined in said step g) wherein, for each of said at least one temporary closed-loop path, at least one of said conduit segments arranged substantially colinearly have a total weight value that is greatest; and i) excluding from consideration in said distribution solution said at least one of said conduit segments having a total weight value that is greatest from each of said at least one temporary closed-loop path wherein said distribution solution is defined by remaining ones of said conduit segments not so-excluded by said steps e), f), g) and i) that are part of a path linking any of said ones of said plurality of sources deemed available to one of said plurality of loads.

5. A method according to claim 4 wherein a condition exists that renders at least one of said conduit segments unusable, said method further comprising the step of eliminating from consideration in said distribution solution each of said at least one of said conduit segments rendered unusable prior to performing said step b).

6. A method according to claim 3 wherein said step f) of continually redefining includes the step of maintaining for consideration in said distribution solution at least one of said conduit segments in said composite tree as a link to each of said plurality of loads.

* * * * *